United States Patent
Cagno et al.

(10) Patent No.: US 9,619,426 B2
(45) Date of Patent: *Apr. 11, 2017

(54) OUT-OF-BAND SIGNALING SUPPORT OVER STANDARD OPTICAL SFP

(71) Applicant: International Business Machines Corporation, Armonk, NY (US)

(72) Inventors: Brian J. Cagno, Tucson, AZ (US); John C. Elliott, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/530,019

(22) Filed: Oct. 31, 2014

(65) Prior Publication Data

US 2015/0052398 A1    Feb. 19, 2015

Related U.S. Application Data

(63) Continuation of application No. 11/669,668, filed on Jan. 31, 2007, now Pat. No. 8,897,313.

(51) Int. Cl.
*H04L 12/28* (2006.01)
*G06F 13/42* (2006.01)
(Continued)

(52) U.S. Cl.
CPC ........ *G06F 13/4221* (2013.01); *G06F 11/079* (2013.01); *G06F 11/0745* (2013.01); *G06F 13/4265* (2013.01); *H04L 67/1097* (2013.01)

(58) Field of Classification Search
USPC ................. 370/419, 463, 252, 241
See application file for complete search history.

(56) References Cited

U.S. PATENT DOCUMENTS 5,465,396 A    11/1995    Hunsinger et al.
6,023,612 A *  2/2000    Harris ................... H01P 1/2138
                                                            330/295

(Continued)

FOREIGN PATENT DOCUMENTS

WO    WO00/28454        5/2000
WO    WO 02/063800 A1    8/2002

OTHER PUBLICATIONS

U.S. Appl. No. 11/669,651.
U.S. Appl. No. 11/669,668.

*Primary Examiner* — John Pezzlo
(74) *Attorney, Agent, or Firm* — Stephen R. Tkacs; Stephen J. Walder, Jr.; Randall J. Bluestone

(57) ABSTRACT

An out-of-band to optical conversion component is provided that uses a transmit disable signal and a receive loss of signal (LOS) signal built into optical small form-factor pluggable transceiver and cable to pass the out-of-band protocol between serial attached SCSI enclosures. The transmit disable signal, when asserted, turns off the optical output, while the receive LOS signal detects the loss of signal. The out-of-band to optical conversion component sits in line on the serial attached SCSI data traffic and strips off the out-of-band signals from the serial attached SCSI expander so that only data flows over the optical cable. The out-of-band to optical conversion component sends the out-of-band signals to the other enclosure using the transmit disable pin on the small form-factor pluggable transceiver and cable. The other enclosure receives the message on the receive LOS signal and transmit it back onto the serial attached SCSI receive data pair.

20 Claims, 3 Drawing Sheets

(51) Int. Cl.
  *G06F 11/07* (2006.01)
  *H04J 1/16* (2006.01)
  *H04L 29/08* (2006.01)

(56) References Cited

U.S. PATENT DOCUMENTS

| | | |
|---|---|---|
| 6,418,121 B1 | 7/2002 | Flickinger et al. |
| 7,039,064 B1 | 5/2006 | Paulson et al. |
| 7,054,972 B2 | 5/2006 | Parry et al. |
| 7,149,397 B2 | 12/2006 | Popovic et al. |
| 7,149,430 B2 | 12/2006 | Hosking et al. |
| 7,317,934 B2 | 1/2008 | Xu et al. |
| 7,536,584 B2 | 5/2009 | Davies et al. |
| 7,630,631 B2 | 12/2009 | Aronson et al. |
| 7,673,078 B2 | 3/2010 | Cagno et al. |
| 2002/0162010 A1 | 10/2002 | Allen et al. |
| 2003/0208581 A1 | 11/2003 | Behren et al. |
| 2004/0022306 A1 | 2/2004 | Baumgartner |
| 2004/0081187 A1 | 4/2004 | Warren et al. |
| 2004/0136721 A1 | 7/2004 | Giaretta et al. |
| 2004/0260798 A1* | 12/2004 | Addington et al. ... H04H 20/78 709/223 |
| 2005/0089334 A1 | 4/2005 | Regev et al. |
| 2005/0138261 A1 | 6/2005 | Marushak et al. |
| 2005/0196109 A1 | 9/2005 | Kim et al. |
| 2005/0213982 A1 | 9/2005 | Weber |
| 2006/0025018 A1 | 2/2006 | Dube et al. |
| 2006/0093280 A1 | 5/2006 | McColloch et al. |
| 2007/0127920 A1 | 6/2007 | Ghiasi et al. |
| 2007/0133562 A1 | 6/2007 | Ghiasi |
| 2007/0223517 A1 | 9/2007 | Warren et al. |
| 2008/0050074 A1 | 2/2008 | Dallesasse et al. |
| 2010/0296815 A1 | 11/2010 | Petty et al. |
| 2011/0106997 A1 | 5/2011 | Romero et al. |

* cited by examiner

OUT-OF-BAND SIGNALING SUPPORT OVER STANDARD OPTICAL SFP

BACKGROUND

1. Technical Field

The present application relates generally to an improved data processing system and method. More specifically, the present application is directed at providing a means to transmit serial attached SCSI out-of-band primitives over an optical interface.

2. Description of Related Art

Small computer system interface (SCSI) is a hardware interface that allows for the connection of up to fifteen peripheral devices to a SCSI host adapter. SCSI uses a bus structure and functions like a mini-network connecting sixteen devices, with the host adapter counting as one device. SCSI allows any two devices to communicate at one time.

Serial attached SCSI (SAS) is emerging as the next adopted high end hard disk drive (HDD). SAS is a serial version of the SCSI interface, which has been parallel since its inception in 1986. SAS is a point-to-point architecture that uses a host bus adapter with four or more channels that operate simultaneously. SAS has several benefits over currently accepted Fibre Channel HDDs, such as including support for existing SCSI commands, larger configuration sizes theoretically reaching 16,384 devices, support for serial ATA (SATA) built into the protocol, and out-of-band (OOB) signaling.

Out-of-band signals are low-speed signal patterns detected by the physical interface. The patterns do not appear in normal data streams, and are used to reset the link, identify the type of attached devices, and negotiate link rate. The patterns consist of defined amounts of idle time followed, by defined amounts of burst time, and are transmitted using the same wires used for primary communication.

Larger configurations of SAS storage devices require cable connections between storage enclosures. A popular solution today with Fibre Channel HDD enclosures is optical small form-factor pluggable transceiver and cables. The small form-factor pluggable (SFP) is a compact optical transceiver used in optical communications for both telecommunication and data communications applications. The SFP interfaces a network device to a fiber optic or unshielded twisted pair networking cable.

Having an optical interconnect has numerous advantages over copper interconnect solutions, including lower electromagnetic emissions, less bulky mechanicals allowing for robust strain relief and easier cable routing, and dramatically improved supported cable lengths supporting kilometers of cable distance versus just a few meters with existing SAS solutions. The problem that exists today is how to pass the out-of-band signaling built into the SAS protocol over the standard optical SFPs available today. Optical SFPs transmit data by turning a laser diode (generically any light source) on and off, which represents the logic level "1" and logic level "0".

One issue is that the ODE signaling protocol requires a third logic state for a bus IDLE, which is not presently possible with optical SFPs. In copper interconnects the SAS interface is a differential pair. When normal data is being transmitted, one signal is driven high while the other signal in the pair is driven low. The receiver subtracts the signal. As part of the OOB protocol, the two signals of the pair must equal each other to present an IDLE to the receiver. Currently, it is not possible for an optical SEP to transmit the IDLE condition.

SUMMARY

The illustrative embodiments herein recognize the disadvantages of the prior art and provide an out-of-band to optical conversion component that uses a transmit disable signal (TX_DISABLE) and a receive loss of signal (RX_LOS) signal built into optical small form-factor pluggable transceiver module and fiber to pass the out-of-band protocol between serial attached SCSI enclosures. The transmit disable signal, when asserted, turns off the optical output, while the receive RX_LOS signal detects the loss of signal. The out-of-band to optical conversion component sits in line on the serial attached SCSI data traffic and strips off the out-of-band signals from the serial attached SCSI expander so that only data flows over the optical cable. The out-of-band to optical conversion component sends the out-of-band signals to the other enclosure using the transmit disable pin on the small form-factor pluggable transceiver module and fiber cable. The other enclosure receives the message on the receiver RX_LOS signal. Once the message is identified the OOB conversion component multiplexes the message back onto the electrical bus of the serial attached SCSI receive data pair.

In one illustrative embodiment, a computer program product comprises a computer useable medium having a computer readable program. The computer readable program, when executed on a computing device, causes the computing device to strip an out-of-band serial attached small computer system interface message off a serial attached small computer system interface transmit data pair and send the out-of-band serial attached small computer system interface message using a first electrical control line of an optical fiber cable.

In one exemplary embodiment, the computer readable program, when executed on the computing device, further causes the computing device to receive an out-of-band message on a second electrical control line of the optical fiber cable and forward the out-of-band message on the serial attached small computer system interface transmit data pair. In a further exemplary embodiment, the optical fiber cable is a small form-factor pluggable fiber cable. In a still further exemplary embodiment, receiving an out-of-band message comprises determining that a receive loss of signal line is asserted and detecting an out-of-band message on toe receive loss of signal line.

In a further exemplary embodiment, the computer readable program, when executed on the computing device, further causes the computing device to determine whether a timeout occurs without an out-of-band message being detected responsive to the receive loss of signal line being asserted and detect a loss of signal responsive to a timeout occurring without an out-of-band message being detected.

In another exemplary embodiment, the computer readable program, when executed on the computing device, further causes the computing device to reroute a serial attached small computer system interface link from a serial attached small computer system interface expander to a conversion component prior to sending the out-of-band message. The conversion component sends the out-of-band message. In a further exemplary embodiment, the computer readable program, when executed on the computing device, further causes the computing device to reconnect the serial attached small computer system interface expander to the optical fiber cable after sending the out-of-band message.

In yet another exemplary embodiment, sending the out-of-band message comprises asserting the first electrical control line to indicate an IDLE and oscillating the first electrical control line to indicate an ALIGN BURST.

In another illustrative embodiment, an apparatus is provided in a serial attached small computer system interface storage enclosure for communicating out-of-band serial attached small computer system interface messages across an optical fiber cable. The apparatus comprises a conversion component configured to strip an out-of-band message off a serial attached small computer system interface transmit data pair and a communication component configured to send the out-of-band message using a first electrical control line of the optical fiber cable.

In one exemplary embodiment, the conversion component is further configured to receive an out-of-band message on a second electrical control line of the optical fiber cable. The communication component is further configured to forward the out-of-band message on the serial attached small computer system interface transmit data pair. In a further exemplary embodiment, the optical fiber cable is a small form-factor pluggable fiber cable. In a still further exemplary embodiment, the first electrical control line is a transmit disable line. In a further exemplary embodiment, the second electrical control line is a receive loss of signal line.

In another exemplary embodiment, the communication component sends the out-of-band message by asserting the first electrical control line to indicate an IDLE and oscillates the first electrical control line to indicate an ALIGN BURST.

In yet another exemplary embodiment, the apparatus further comprises a serial attached small computer system interface expander, one-or more storage devices connected to the serial attached small computer system interface expander, and an optical fiber cable connector.

In a further illustrative embodiment, a method is provided in a serial attached small computer system interface storage enclosure for communicating out-of-band serial attached small computer system interface messages across an optical fiber cable. The method comprises stripping an out-of-band message off a serial attached small computer system interface transmit data pair and sending the out-of-band message using a first electrical control line of the-optical fiber cable.

In one exemplary embodiment, the method further comprises receiving an out-of-band message on a second electrical control line of the optical fiber cable and forwarding the out-of-band message on the serial attached small computer system interface transmit data pair. In a further exemplary embodiment, receiving an out-of-band message comprises determining that a receive loss of signal line is asserted and detecting an out-of-band message on the receive loss of signal line. In a still further exemplary embodiment, the method further comprises responsive to the receive loss of signal line being asserted, determining whether a timeout occurs without an out-of-band message being detected, and responsive to a timeout occurring without an out-of-band message being detected, detecting a loss of signal.

In another exemplary embodiment, sending the out-of-band message comprises asserting the first electrical control line to indicate an IDLE and oscillating the first electrical control line to indicate an ALIGN BURST.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
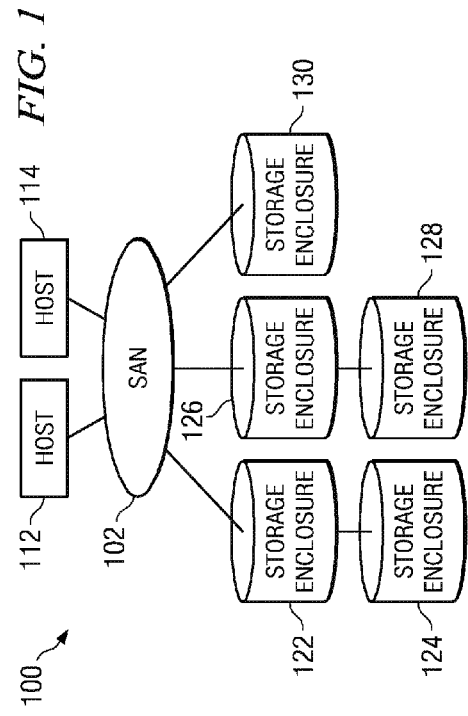
FIG. 1 depicts a pictorial representation of an exemplary distributed data processing system in which aspects of the illustrative embodiments may be implemented.

With reference now to the figures and in particular with reference to FIG. 1, an exemplary diagram of a data processing environment is provided in which illustrative embodiments of the present invention may be implemented. It should be appreciated that FIG. 1 is only exemplary and is not intended to assert or imply any limitation with regard to the environments in which. aspects or embodiments of the present invention may be implemented. Many modifications to the depicted environment may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one storage area network (SAN) 102, which is the medium used to provide communication links between various devices and computers connected together within distributed data processing system 100. The storage area network 102 may include connections, such as wire, wireless communication links, or, in one embodiment, fiber optic cables.

In the depicted example, host 112 and host 114 are connected to SAN 102. in addition, storage enclosures 122, 126, and 130 are also connected to network 102. Storage enclosure 124 is connected to storage enclosure 122, and storage enclosure 128 is connected to storage enclosure 126. Distributed data processing system 100 may include additional hosts, storage enclosures, and other devices not shown. Storage enclosures 122-130 may be, for example, serial attached SCSI (SAS) storage enclosures.

In one exemplary embodiment, storage enclosures 122-130 may be connected using fiber cables, such as optical small, form-factor pluggable (SFP) cables. Having an optical interconnect has numerous advantages over copper interconnect solutions, including lower electromagnetic emissions, less bulky mechanicals allowing for robust strain relief and easier cable routing, and dramatically improved supported cable lengths supporting kilometers of cable distance versus just a few meters with existing SAS solutions. The problem that exists today is how to pass the out-of-band (OOB) signaling built into the SAS protocol over the standard optical SFPs available today. Optical SFPs transmit data by turning a light source on and off, which represents the logic level "1" and logic level "0".

However, the OOB signaling protocol requires a third logic state for an IDLE, which is not presently possible with optical SFPs. In copper interconnects the SAS interface is a differential pair. When normal data is be transmitted, one signal is driven high while the other signal in the pair is driven low. The receiver subtracts the signal. As part of the OOB protocol, the two signals of the pair must equal each other to present an IDLE to the receiver. Currently, it is not possible for an optical SFP to transmit the IDLE condition.

Thus, in accordance with an illustrative embodiment, each enclosure includes an out-of-band to optical conversion component that uses a transmit disable signal (TX_DISABLE) and a receive loss of signal (RX_LOS) signal built into optical small form-factor pluggable transceiver and cable to pass the out-of-band protocol between serial attached SCSI enclosures. TX_DISABLE and RX_LOS are electrical control signals for the optics. The TX_DISABLE signal, when asserted, turns off the optical output, while the RX_LOS signal detects the loss of signal. The out-of-band to optical conversion component sits in line on the serial attached SCSI data traffic and strips off the out-of-band signals from the serial attached SCSI expander so that only data flows over the optical cable. The out-of-band to optical conversion component sends the out-of-band signals to the other enclosure using the TX_DISABLE pin on the small form-factor pluggable transceiver and cable. The other enclosure receives the message on the RX_LOS signal and transmit it back onto the serial attached SCSI receive data pair.

Figure 2:
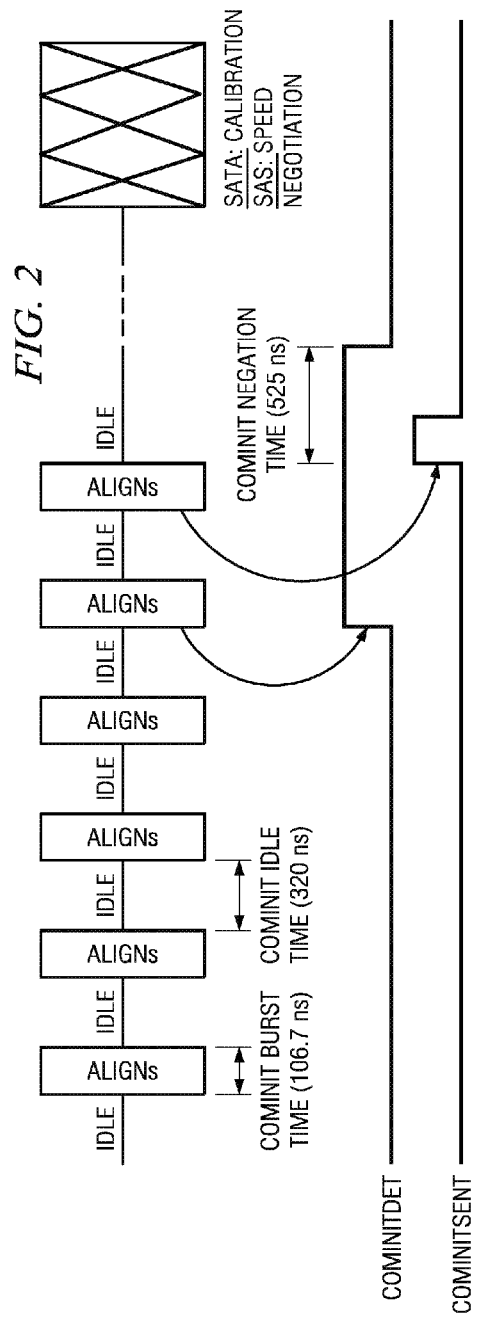
FIG. 2 represents an example of out-of-band signaling that may be implemented using the exemplary aspects of the illustrative embodiments.

FIG. 2 represents an example of out-of-band signaling that may be implemented using the exemplary aspects of the illustrative embodiments. The out-of-band to optical conversion component may use the TX_DISABLE (transmit side) and RX_LOS (receive side) signals in a small form-factor pluggable (SFP) optical cable to transmit out-of-band signals, with the exception of slowing down the ALIGN BURST rate. Normally, in the SFP, the TX_DISABLE signal remains low, or logical zero, whenever the cable is operating properly. When TX_DISABLE is asserted, or logical one, the optical output is turned off. At the receive side, when the RX_LOS signal is asserted, or logical one, this signifies a loss of signal.

In accordance with an illustrative embodiment, an OOB to optical conversion component strips off the out-of-band signals from the serial attached SCSI expander so that only data flows over the optical cable. The OOB to optical conversion component then transmits the OOB signaling via the TX_DISABLE in by deasserting (logical zero) TX_DISABLE to represent an IDLE and oscillating TX_DISABLE to represent an ALIGN BURST.

The SAS protocol uses the data link transmission rate, which is 1.5 GHz or higher for the ALIGN BURST frequency. However, an SFP cannot cycle on and off the optical output that quickly. Using one example optical SFP specification, the fastest data clock rate may be 825 Hz. However, it may be desirable to reuse the protocol for implementation.

The example depicted in FIG. 2 represents a SAS communication reset (COMRESET) transaction. The OOB signaling consists of an IDLE, followed by an ALIGN BURST, IDLE, ALIGN BURST, and so on. The ALIGN BURST time is 106.7 ns. The COMINIT IDLE time is 320 ns. Since the SFP transceiver cannot be cycled to meet the timings defined for SAS OOB, the relative timings of COMINIT IDLE approximately three times the duration of ALIGN BURST is used to communicate the SAS OOB protocol at a low transmission rate across the optical interface. Once the OOB conversion component receives and identifies the OOB message, the OOB conversion component multiplexes the SAS OOB message onto the electrical bus at normal SAS OOB timings.

In other implementations, the transmission over the SFP does not need to follow the SAS OOB protocol. The controlling element may simply forward a message independent of any protocol, as long as both ends can interpret the communication. The devices can convert the message to SAS OOB protocol and forward to the device link.

Figure 3:
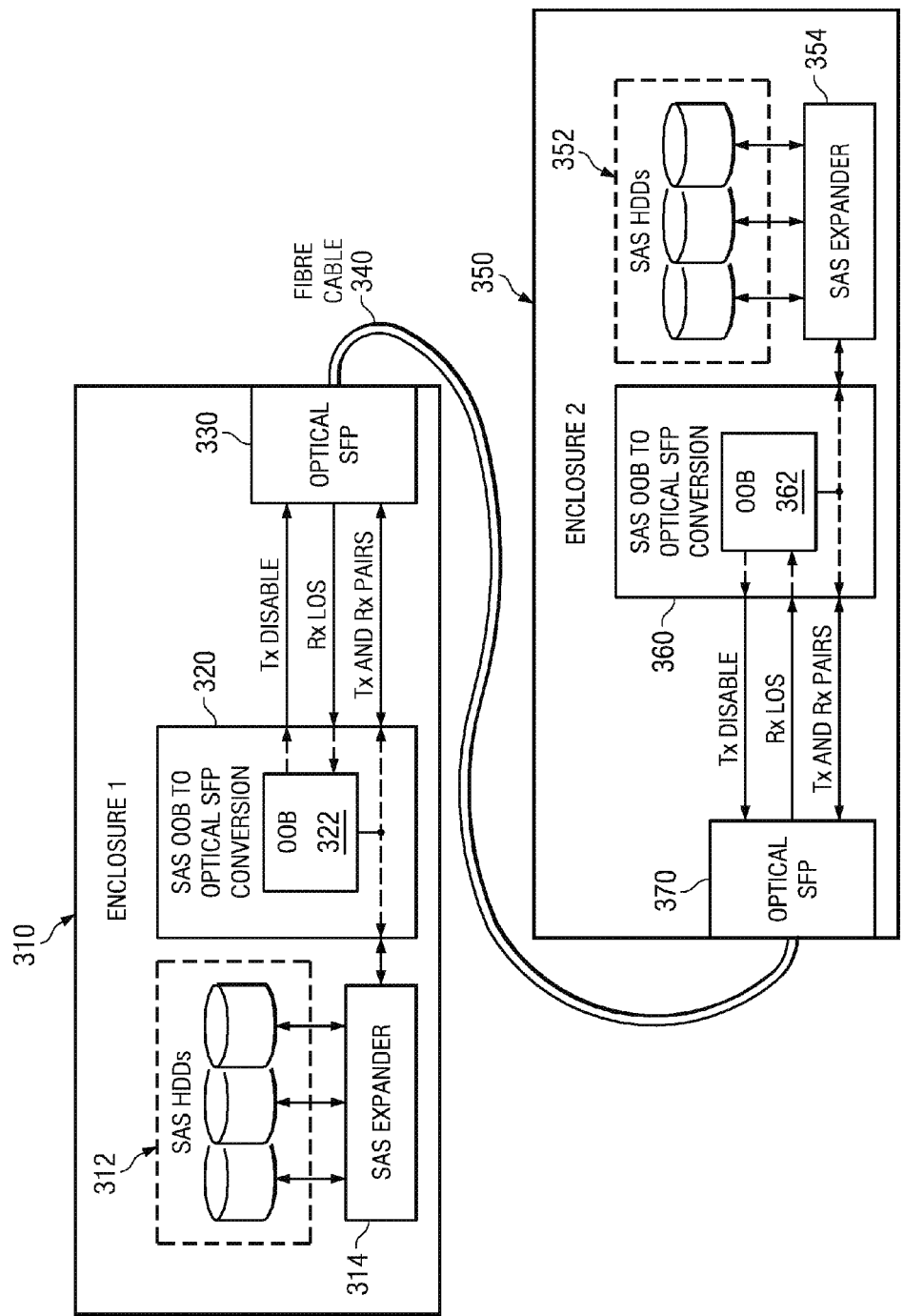
FIG. 3 is a block diagram illustrating storage enclosures with serial attached SCSI out-of-band. signaling over an optical small form-factor pluggable transceiver and cable in accordance with an illustrative embodiment.

FIG. 3 is a block diagram illustrating storage enclosures with serial attached SCSI out-of-band signaling over an optical small form-factor pluggable transceiver and cable in accordance with an illustrative embodiment. Enclosure 1 310 comprises a plurality of serial attached SCSI (SAS) hard disk drives 312 connected to SAS expander 314. Enclosure 1 is connected to enclosure 2 via fibre cable 340. Enclosure 1 connects to fibre cable 340 using optical small form-factor pluggable (SFP) connector 330.

SAS out-of-band (OOB) to optical SFP conversion component 320 lies between SAS expander 314 and optical SFP connector 330. SAS OOB to optical SFP conversion component 320 sits in line on the SAS data traffic and strips off the OOB signaling from SAS expander 314 so that only data flows over the fiber cable. Conversion component 320 sends the OOB message to enclosure 2 350 via OOB communication component 322.

OOB communication component 322 uses the TX_DISABLE pin of optical SFP connector 330 to transmit the OOB message. Enclosure 2 350 comprises a plurality of SAS hard disk drives 352 connected to SAS expander 354. Enclosure 2 350 receives the OOB message on RX_LOS at optical SFP connector 370. SAS out-of-band (OOB) to optical SFP conversion component 360 lies between SAS expander 354 and optical SFP connector 370. OOB communication component 362 receives the OOB message on RX_LOS, and SAS OOB to optical SFP conversion component 360 converts the OOB message to the SAS protocol and transmits it back onto the transmit and receive data pair to SAS expander 354.

Figure 4:
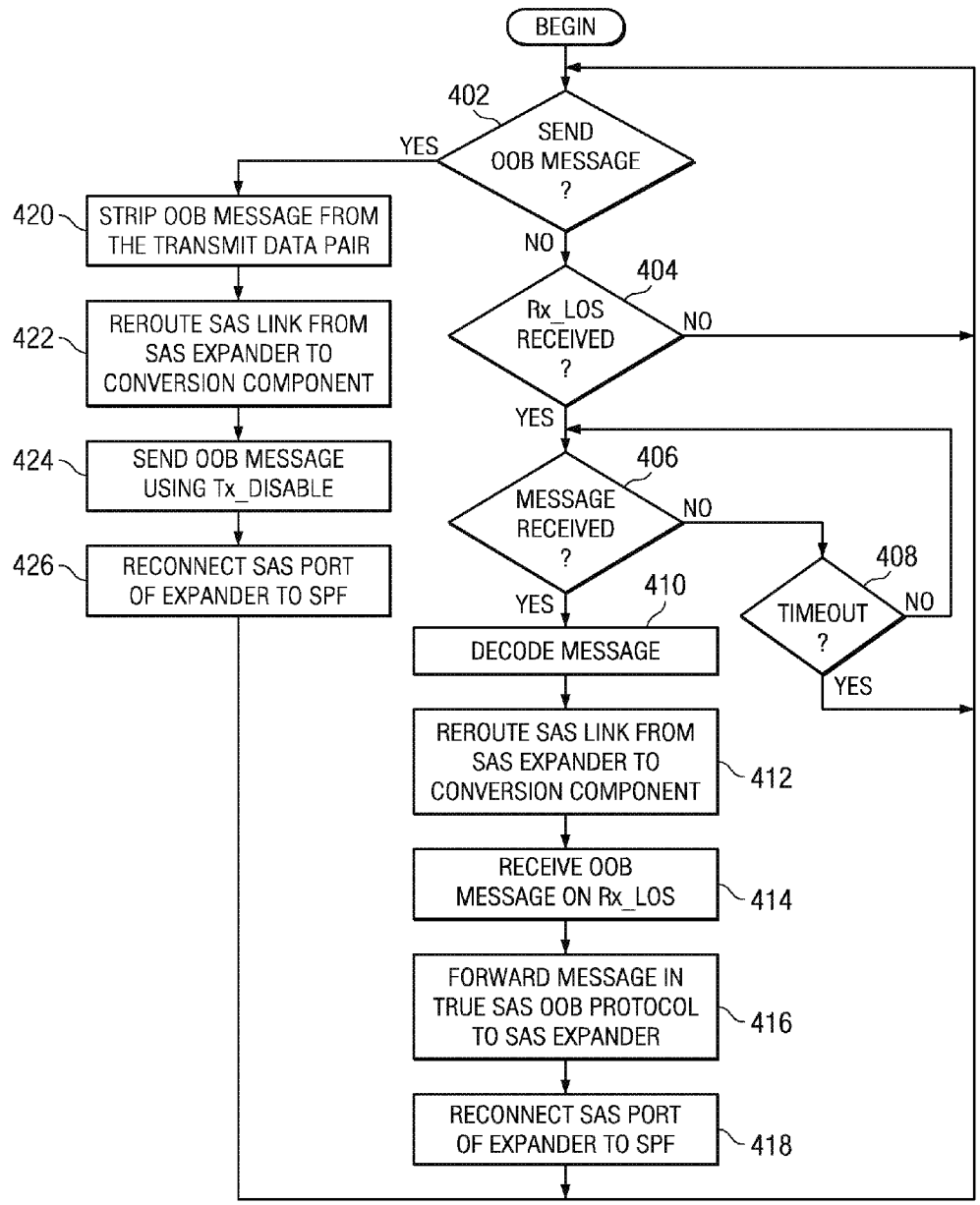
FIG. 4 is a flowchart illustrating an exemplary operation of out-of-band to optical conversion in accordance with an illustrative embodiment.

FIG. 4 is a flowchart, illustrating exemplary operation of out-of-band to optical conversion in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware, such as a state machine, and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIG. 4, operation begins and the out-of-band to optical conversion component determines whether to send an out-of-band message (block 402). If the out-of-band to optical conversion component determines that an out-of-band message is not ready to be sent, the out-of-band to optical conversion component determines whether a RX_LOS signal is received (block 404). In the illustrative embodiment, an RX_LOS signal may represent only that an out-of-band message is being sent. However, in an alternative embodiment, the out-of-band to optical conversion component may be configured to differentiate between an ordinary loss of signal and a RX_LOS signal bearing an out-of-band message.

If a RX_LOS signal is not received, operation returns to block 402 to determine whether to send an OOB message. If a RX_LOS signal is received in block 404, the out-of-band to optical conversion component determines whether an OOB message is received (block 406). If an OOB message is not received, the out-of-band to optical conversion component determines whether a timeout occurs (block 408). If a timeout does not occur, operation returns to block 406 to determine whether an OOB message is received. If a timeout does occur in block 408 without an OOB message being received, then. operation returns to block 402 to determine whether to send an OOB message. As mentioned above, if the out-of-band to optical conversion component receives a RX_LOS signal without receiving an OOB message, this may indicate an actual loss of signal. Therefore, if a timeout occurs in block 408 without an OOB message being received, the enclosure may process the loss of signal in a conventional manner.

If an OOB message is received in block 406, the out-of-band to optical conversion component decodes the message (block 410). Then, the out-of-band to optical conversion component reroutes the SAS ink from the SAS expander to the conversion component (block 412) and receives the OOB message on RX_LOS (block 414). The out-of-band to optical conversion component forwards the message in true SAS OOB protocol to the SAS expander (block 416) and reconnects the SAS port of the SAS expander to the SPF connector (block 418). Thereafter, operation returns to block 402 to determine whether to send an OOB message.

Returning to block 402, the out-of-band to optical conversion component may determine that an OOB message is to be sent by detecting an OOB message on the transmit data pair. If the out-of-band to optical conversion component determines that an COB message is to be sent, the out-of-band to optical conversion component strips the OOB message from the transmit data pair (block 420) and reroutes the SAS link from the SAS expander to the out-of-band to optical conversion component (block 422). Next, the out-of-band to optical conversion component sends the OOB message using the TX_DISABLE pin on the SFP (block 424). Then, the out-of-band to optical conversion component reconnects the SAS port of the SAS expander to the SPF (block 426). Thereafter, operation returns to block 402 to determine whether an OOB message is to be sent.

Thus, the illustrative embodiments solve the disadvantages of the prior art by providing an out-of-band to optical conversion component that uses a transmit disable signal (TX_DISABLE) and a receive loss of signal (RX_LOS) signal built into optical small form-factor pluggable transceiver and cable to pass the out-of-band protocol between serial attached SCSI enclosures. The transmit disable signal, when asserted, turns off the optical output, while the receive RX_LOS signal detects the loss of signal. The out-of-band to optical conversion component sits in line on the serial attached SCSI data traffic and strips off the out-of-band signals from the serial attached SCSI expander so that only data flows over the optical cable. The out-of-band to optical conversion component sends the out-of-band signals to the other enclosure using the transmit disable pin on the small form-factor pluggable transceiver and cable. The other enclosure receives the message on the receive LOS signal and transmit it back onto the serial attached SCSI receive data pair.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or IO devices (including but not limited to keyboards, displays, pointing devices, etc.) can be coupled to the system either directly or through intervening IO controllers. Network adapters may also be coupled to the system to enable the data processing system to become coupled to other data processing systems or remote printers or storage devices through intervening private or public networks. Modems, cable modem and Ethernet cards are just a few of the currently available types of network types network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer useable medium having a computer readable program, wherein the computer readable program, when executed on a computing device, causes the computing device to:
    strip an out-of-band serial attached small computer system interface message off a serial attached small computer system interface transmit data pair; and
    send the out-of-band serial attached small computer system interface message using a first electrical control line of an optical fiber cable, wherein the first electrical control line is a transmit disable line.

2. The computer program product of claim 1, wherein the computer readable program, when executed on the computing device, further causes the computing device to:
    receive an out-of-band message on a second electrical control line of the optical fiber cable, wherein the second electrical control line is a receive loss of signal line; and
    forward the out-of-band message on the serial attached small computer system interface transmit data pair.

3. The computer program product of claim 2, wherein receiving an out-of-band message comprises:
    determining that the receive loss of signal line is asserted; and
    detecting the out-of-band message on the receive loss of signal line.

4. The computer program product of claim 3, wherein the computer readable program, when executed on the computing device, further causes the computing device to:
    determine whether a timeout occurs without an out-of-band message being detected responsive to the receive loss of signal line being asserted; and
    detect a loss of signal responsive to a timeout occurring without an out-of-band message being detected.

5. The computer program product of claim 1, wherein the optical fiber cable is a small form-factor pluggable fiber cable.

6. The computer program product of claim 1, wherein the computer readable program, when executed on the computing device, further causes the computing device to:
    prior to sending the out-of-band message, reroute a serial attached small computer system interface link from a serial attached small computer system interface expander to a conversion component,
    wherein the conversion component sends the out-of band message.

7. The computer program product of claim 6, wherein the computer readable program, when executed on the computing device, further causes the computing device to:

after sending the out-of-band message, reconnect the serial attached small computer system interface expander to the optical fiber cable.

8. The computer program product of claim 1, wherein sending the out-of-band message comprises:
    asserting the first electrical control line to indicate an IDLE; and
    oscillating the first electrical control line to indicate an ALIGN BURST.

9. An apparatus in a serial attached small computer system interface storage enclosure for communicating out-of-band serial attached small computer system interface messages across an optical fiber cable, the apparatus comprising:
    a conversion component configured to strip an out-of-band message off a serial attached small computer system interface transmit data pair; and
    a communication component configured to send the out-of-band message using a first electrical control line of the optical fiber cable, wherein the first electrical control line is a transmit disable line.

10. The apparatus of claim 9, wherein the conversion component is further configured to receive an out-of-band message on a second electrical control line of the optical fiber cable and wherein the communication component is further configured to forward the out-of-band message on the serial attached small computer system interface transmit data pair.

11. The apparatus of claim 10, wherein the second electrical control line is a receive loss of signal line.

12. The apparatus of claim 9, wherein the optical fiber cable is a small form-factor pluggable fiber cable.

13. The apparatus of claim 9, wherein the communication component sends the out-of-band message by asserting the first electrical control line to indicate an IDLE and oscillates the first electrical control line to indicate an ALIGN BURST.

14. The apparatus of claim 9, further comprising:
    a serial attached small computer system interface expander;
    one or more storage devices connected to the serial attached small computer system interface expander; and
    an optical fiber cable connector.

15. A method in a serial attached small computer system interface storage enclosure for communicating out-of-band serial attached small computer system interface messages across an optical fiber cable, the method comprising:
    stripping an out-of-band message off a serial attached small computer system interface transmit data pair; and
    sending the out-of-band message using a first electrical control line of the optical fiber cable, wherein the first electrical control line is a transmit disable line.

16. The method of claim 15, further comprising:
    receiving an out-of-band message on a second electrical control line of the optical fiber cable, wherein the second electrical control line is a receive loss of signal line; and
    forwarding the out-of-band message on the serial attached small computer system interface transmit data pair.

17. The method of claim 16, wherein receiving an out-of-band message comprises:
    determining that the receive loss of signal line is asserted; and
    detecting the out-of-band message on the receive loss of signal line.

18. The method of claim 17, further comprising:
responsive to the receive loss of signal line being asserted, determining whether a timeout occurs without an out-of-band message being detected; and
responsive to a timeout occurring without an out-of-band message being detected, detecting a loss of signal.

19. The method of claim 15, wherein sending the out-of-band message comprises:
asserting the first electrical control line to indicate an IDLE; and
oscillating the first electrical control line to indicate an ALIGN BURST.

20. The method of claim 15, wherein the optical fiber cable is a small form-factor pluggable fiber cable.

* * * * *